United States Patent
Masuda

(10) Patent No.: US 8,473,592 B2
(45) Date of Patent: Jun. 25, 2013

(54) STORAGE SYSTEM AND MANAGEMENT METHOD IN STORAGE SYSTEM

(75) Inventor: Haruki Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 11/968,371

(22) Filed: Jan. 2, 2008

(65) Prior Publication Data

US 2009/0006601 A1 Jan. 1, 2009

(30) Foreign Application Priority Data

Jun. 28, 2007 (JP) ................................. 2007-170947

(51) Int. Cl.
*G06F 15/173* (2006.01)

(52) U.S. Cl.
USPC .............. 709/223; 709/203; 709/217; 710/38

(58) Field of Classification Search
USPC .... 709/223, 224, 227, 203, 213, 217; 710/38; 711/162, 170
See application file for complete search history.

(56) References Cited

U.S. PATENT DOCUMENTS

| | | | | |
|---|---|---|---|---|
| 6,629,189 B1 * | 9/2003 | Sandstrom et al. | ............. | 710/38 |
| 6,834,298 B1 * | 12/2004 | Singer et al. | .................. | 709/223 |
| 7,013,372 B2 * | 3/2006 | Achiwa et al. | ................ | 711/162 |
| 7,222,348 B1 * | 5/2007 | Athreya et al. | ............... | 719/321 |
| 7,272,674 B1 * | 9/2007 | Nandi et al. | .................... | 710/38 |
| 7,356,640 B2 * | 4/2008 | Suishu et al. | ................ | 711/100 |
| 7,424,638 B2 * | 9/2008 | Borianne | ..................... | 714/6.32 |
| 7,831,761 B2 * | 11/2010 | Phelan et al. | .................... | 710/38 |
| 2002/0138615 A1 * | 9/2002 | Schmeling | ..................... | 709/225 |
| 2002/0161596 A1 * | 10/2002 | Johnson et al. | .................... | 705/1 |
| 2003/0061318 A1 * | 3/2003 | Abdelhadi et al. | ............ | 709/221 |
| 2003/0195953 A1 | 10/2003 | Suzuki et al. | | |
| 2004/0109457 A1 * | 6/2004 | Johnson et al. | ............... | 370/401 |
| 2004/0221041 A1 * | 11/2004 | Tabbara | ........................ | 709/227 |
| 2004/0221049 A1 * | 11/2004 | Blumenau et al. | ............ | 709/229 |
| 2004/0267382 A1 * | 12/2004 | Cunningham et al. | .......... | 700/22 |
| 2005/0165922 A1 * | 7/2005 | Hatano | .......................... | 709/223 |
| 2005/0198369 A1 * | 9/2005 | Armstrong et al. | ........... | 709/238 |
| 2005/0234966 A1 | 10/2005 | Fujino et al. | | |
| 2006/0136522 A1 | 6/2006 | Sakashita et al. | | |

(Continued)

FOREIGN PATENT DOCUMENTS

| | | |
|---|---|---|
| JP | 2003 316671 | 11/2003 |
| JP | 2005 309479 | 11/2005 |

(Continued)

*Primary Examiner* — Ramy M Osman

(74) *Attorney, Agent, or Firm* — Brundidge & Stanger, P.C.

(57) ABSTRACT

An object of the present invention is to recognize the presence of a business-use computer that can be a management target of a management computer, and to register the recognized business-use computer as a management target host.

A storage system includes business-use hosts 12 and 14, a management server 16 and a storage subsystem 18; wherein the business-use hosts 12 and 14 are connected via a SAN 22 to the storage subsystem 18, while the management server 16 is connected via a LAN 20 to the business-use hosts 12 and 14 and the storage subsystem 18. The management server 16 for recognizing business-use hosts that can be management objects, sends a communication request to all the IP addresses/ports within a range specified by the user, and registers business-use hosts returning a response in reply to the communication request as management targets.

7 Claims, 14 Drawing Sheets

U.S. PATENT DOCUMENTS

| | | | |
|---|---|---|---|
| 2006/0143332 A1* | 6/2006 | Yagi et al. | 710/38 |
| 2006/0215552 A1 | 9/2006 | Iwata et al. | |
| 2007/0055797 A1 | 3/2007 | Shimozono | |
| 2007/0094147 A1* | 4/2007 | Fukui et al. | 705/59 |
| 2008/0016311 A1* | 1/2008 | Harada | 711/170 |

FOREIGN PATENT DOCUMENTS

| | | |
|---|---|---|
| JP | 2006 172385 | 6/2006 |
| JP | 2006-268625 | 10/2006 |
| JP | 2007-072571 | 3/2007 |

\* cited by examiner

FIG.2

| PATH ID | HBA | STORAGE | CHA | LU | PATH STATUS |
|---------|------|---------|------|-----|-------------|
| 0001 | HBA1 | ST1 | CHA1 | LU1 | Online |
| 0002 | HBA2 | ST1 | CHA2 | LU1 | Online |

FIG.3

| HOST NAME | IP ADDRESS | PORT | OS | AGENT | CONSECUTIVE ERROR COUNT | VOLUME MANAGEMENT AGENT |
|-----------|-----------|------|------|-------|-------------------------|------------------------|
| HOST 1 | 172.1.1.1 | 23011 | Linux | 5.0 | 0 | 4.5 |
| HOST 2 | 172.1.1.5 | 23011 | Windows | 5.1 | 3 | - |
| HOST 3 | 172.1.1.6 | - | - | - | - | 5.0 |

FIG.4

| START IP ADDRESS | END IP ADDRESS | PORT | EXECUTION STARTING TIME | FREQUENCY | NEXT EXECUTION TIME |
|---|---|---|---|---|---|
| 172.1.1.1 | 172.1.1.256 | 23011 | 0:00 | EVERY SUNDAY | 2007/05/20 0:00 |
| 172.1.2.1 | 172.1.2.256 | 23011 | 1:00 | EVERY DAY | 2007/05/15 1:00 |

| PATH ID | HOST | HBA | STORAGE | SERIAL NUMBER | CHA | LU | PATH STATUS |
|---|---|---|---|---|---|---|---|
| 0001 | HOST 1 | HBA1 | ST1 | 1234 | CHA1 | LU1 | Online |
| 0002 | HOST 1 | HBA2 | ST1 | 1234 | CHA2 | LU1 | Online |
| 0003 | HOST 2 | HBA1 | ST1 | 1234 | CHA3 | LU2 | Offline |
| 0004 | HOST 2 | HBA2 | ST1 | 1234 | CHA4 | LU2 | Online |

NETWORK SCAN

START IP ADDRESS [ ]~202

END IP ADDRESS [ ]~204

PORT NUMBER [ ]~206

208  210
[EXECUTE] [CANCEL]

NETWORK SCAN RESULT

START IP ADDRESS : 172.168.17.1
END IP ADDRESS : 172.168.17.255
PORT NUMBER : 23015
START TIME : 2007/05/15/ 1:00
END TIME : 2007/05/15/ 1:45
NUMBER OF REGISTERED HOSTS : 5

| # IP ADDRESS | HOST NAME | OS |
|---|---|---|
| 1 172.168.17.200 | HostA | Linux |
| 2 172.168.17.201 | HostB | Linux |
| 3 172.168.17.210 | Host1 | Windows |
| 4 172.168.17.211 | Host2 | Windows |
| 5 172.168.17.212 | Host3 | Windows |

```
                                                        200
┌─────────────────────────────────────────────────────────┐
│  SCHEDULE REGISTRATION                                  │
│                                                         │
│   START IP ADDRESS  [                    ]~202          │
│                                                         │
│   END IP ADDRESS    [                    ]~204          │
│                                                         │
│   PORT NUMBER       [          ]~206                    │
│                                                         │
│   START TIME        [          ]~212                    │
│                                                         │
│       FREQUENCY   O EVERY DAY    ☐ EXCEPT SATURDAYS AND SUNDAYS
│                   O EVERY WEEK  [MONDAY ▼]  ~214        │
│                   O EVERY MONTH [    ] DAY   216    218 │
│                                          [REGISTER] [CANCEL]
└─────────────────────────────────────────────────────────┘
```

FIG.14

| # | START IP ADDRESS | END IP ADDRESS | PORT NUMBER | START TIME | FREQUENCY | NEXT EXECUTION |
|---|---|---|---|---|---|---|
| 1 | 172.168.10.1 | 172.168.10.255 | 23011 | 2:00 | EVERY DAY | 2007/05/18 2:00 |
| 2 | 172.168.20.1 | 172.168.20.255 | 23011 | 1:00 | EVERY WEEK MONDAY | 2007/05/18 1:00 |
| 3 | 172.169.1.1 | 172.169.1.255 | 23011 | 2:00 | MONDAY | 2007/05/21 2:00 |
| 4 | 172.170.1.1 | 172.170.1.255 | 23011 | 3:00 | FIRST DAY | 2007/06/01 3:00 |

SCHEDULE

ADD    EDIT

200

STORAGE SYSTEM AND MANAGEMENT METHOD IN STORAGE SYSTEM

CROSS-REFERENCES TO RELATED APPLICATIONS

This application relates to and claims priority from Japanese Patent Application No. 2007-170947, filed on Jun. 28, 2007, the entire disclosure of which is incorporated herein by reference.

BACKGROUND

1. Field of the Invention

The invention relates to a storage system, and a management method in a storage system, and in particular, relates to a technique for establishing a multi-path to and from a storage subsystem and managing a plurality of business-use computers that send/receive information to/from the storage subsystem.

2. Description of Related Art

A storage apparatus (a storage subsystem) and a host (a host computer) connected to the storage apparatus via a storage area network (SAN) is a known example of a storage system. Between the host and the storage apparatus, there are plural adaptors for connection to the SAN, such as a host bass adaptor (HBA), a channel adaptor (CHA), a fibre channel switch and a hub. These adaptors are connected to one another via a plurality of paths (physical path). A storage apparatus like one with a disk array divides a storage area consisting of a plurality of physical disks into a plurality of logical volumes, and establishes a multi-path system determining paths (access paths) for access from a host to logical volumes by selecting from a plurality of physical paths, arranging multiple access paths to a logical volume, maintaining the access by switching the access paths in the event of a failure, and distributing the access path load by using a plurality of access paths at the same time.

In this situation, when a failure occurs in a multi-path management, access paths relating to the location of the failure will be all switched, so the (Input/Output) traffic in the SAN will significantly changed, and consequently the traffic may be concentrated on a particular adaptor or switch, causing a bottle-neck. Therefore, JP2006-268625 A suggests a multi-path system that perceives possible locations of bottlenecks caused by traffic concentration beforehand and notifies an administrator.

Furthermore, JP2007-72571 A suggests a storage system equipped with a host computer, a storage apparatus providing a logical storage area to the host computer, and a management computer connected to the host computer and the storage device via a network, wherein, when a notice of path failure is sent from the host computer or the storage device to the management computer, the management computer defines a new path for the host computer and the storage device, so that any loss of access path redundancy caused by a port failure in the system can result in the system being automatically restored to a redundant path state.

In related art, it has not been taken into consideration much that host computers (hosts) are added to or removed from a storage system on a daily basis. More specifically, when managing each host by a management computer (management server), where a plurality of host computers (hosts) connected to SAN are management targets, if the management server does not perceive information associated with the addition or removal of hosts connected to SAN, the management computer cannot reliably manage information relating to each host.

SUMMARY

It is an object of the present invention to recognize the presence of a business-use computer that can be a management target for a management computer, and register a recognized business-use computer as a management target host.

In order to achieve the above object, the present invention automatically retrieves or updates information relating to business-use computers that are management targets by sending a communication request, for which a response is expected, to a communication target existing in the range of possible management targets.

Specifically, the present invention provides, a storage system including: a plurality of business-use computers; a storage subsystem to which the plurality of business-use computers are connected; and a management computer managing the plurality of business-use computers, wherein the plurality of business-use computers, the storage subsystem and the management computer are connected to one another via communication means; the management computer has a table for registering a business-use computer connected to the storage subsystem; and the management computer executes a first step of sequentially sending a communication request via the communication means to a communication target that can be the management target, and a second step of registering a reception result, that is associated with a transmission of the communication requests, in a table.

A preferred aspect of the present invention further has the following features. Specifically, the management computer, in the second step, registers a business-use computer, which returns a response in reply to the communication request, in the table as a management target host. Also, the management computer, in the second step, executes a step of registering a business-use computer, that returns a response in reply to the communication request, in the table as a management target host, and then, further executes a third step of sending a communication request to the management target host registered in the table as a communication target, and a fourth step of, if a response in reply to the communication request is not returned from the management target host in accordance with certain conditions, deleting, from the table, the business-use computers that do not return a response.

Also, the management computer, in the first step, recognizes all the IP address ports within a specified range as communication targets. Furthermore, the management computer, in the third step, periodically sends a communication request to the management target hosts registered in the table as a communication target. Moreover, the management computer executes: a fifth step of acquiring host information relating to a business-use computer managed by the management computer from another management computer managing that business-use computer; and a sixth step of recognizing a business-use computer that is under the management of another management computer by comparing the host information acquired in the fifth step and the information registered in the table.

Another aspect of the present invention provides, a management method in a storage system including: a plurality of business-use computers; a storage subsystem to which the plurality of business-use computers are connected; and a management computer managing the plurality of business-use computers, wherein the plurality of business-use computers, the storage subsystem and the management computer are connected to one another via communication means, and the management computer manages a management target via the communication means; and wherein the management computer executes a first step of sequentially sending a communication request to a communication target that can be a management target via the communication means, and the second step of registering a reception result, that is associated with a transmission of the communication request, in a table.

A preferred aspect of the present invention further has the following features. Specifically, the management computer, in the second step, executes a step of registering a business-use computer, which returns a response in reply to the communication request, in the table as a management target host. Also, the management computer, in the second step, executes a step of registering a business-use computer, that returns a response in reply to the communication request, in the table as a management target host, and then executes a third step of sending a communication request to the management target host registered in the table as a communication target, and a fourth step of, if a response in reply to the communication request is not returned from the management target host in accordance with certain conditions, deleting the business-use computer, that does not return the response, from the table.

According to the present invention, a business-use computer, which is a management target for the management computer, is reliably recognized.

Other aspects and advantages of the invention will be apparent from the following description and the appended claims.

BRIEF DESCRIPTION OF THE DRAWINGS

FIG. 2 is a configuration diagram of a path management table.

FIG. 3 is a configuration diagram of a host management table.

FIG. 4 is a configuration diagram of a schedule management table.

FIG. 5 is a configuration diagram of an integrated path management table.

FIG. 11 is a diagram showing an example display of a network scan execution screen.

FIG. 12 is a diagram showing an example display of a network scan execution result screen.

FIG. 13 is a diagram showing an example display of a schedule registration screen.

FIG. 14 is a diagram showing an example display of a schedule list screen.

DETAILED DESCRIPTION OF PREFERRED EMBODIMENTS

Figure 1:
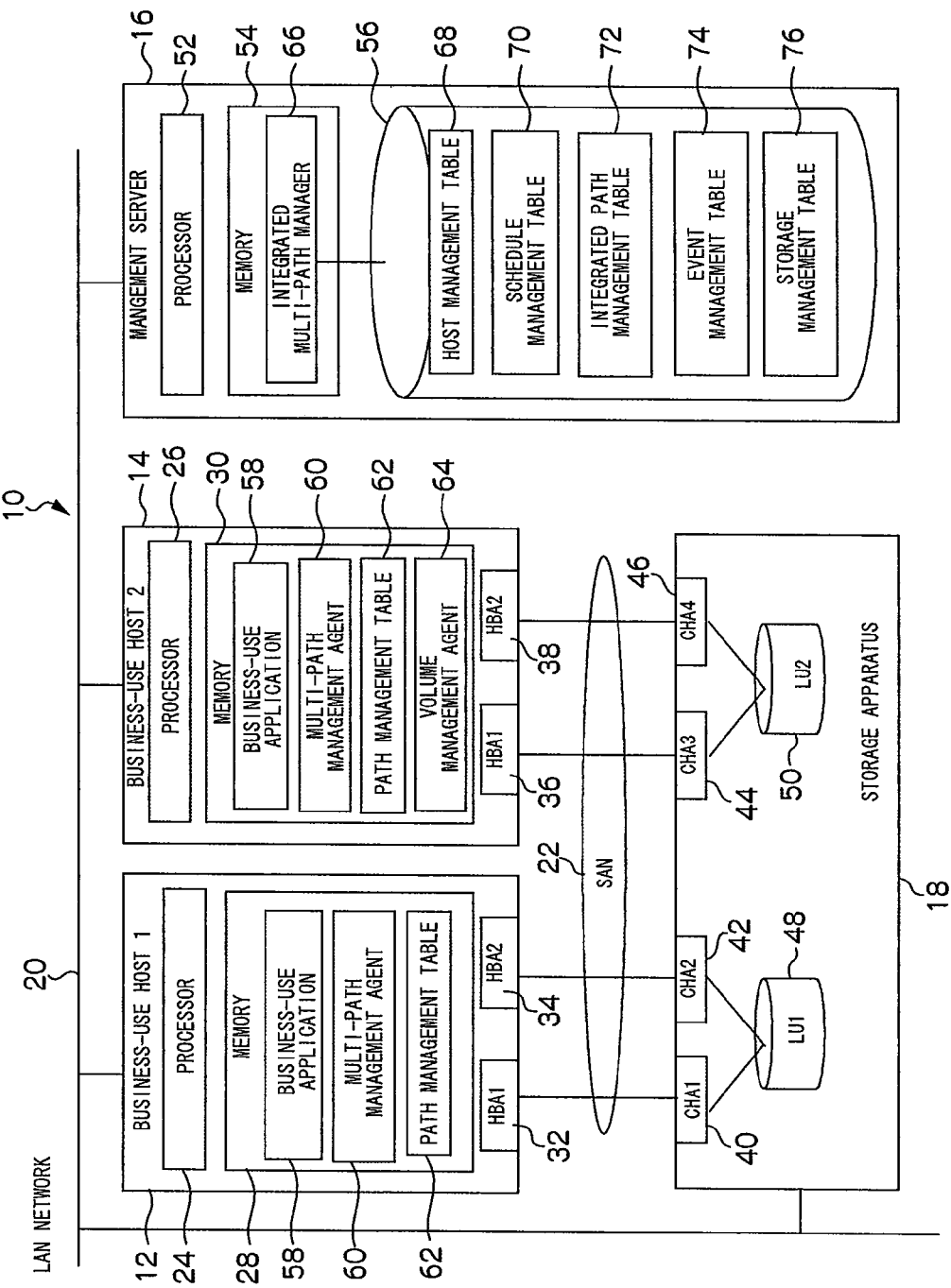
FIG. 1 is a block diagram showing the configuration of a storage system according to an embodiment of the present invention.

Embodiments of the present invention will be described below with reference to the attached drawings. FIG. 1 is a block diagram showing the configuration of a storage system (a storage control system) 10 in which a first embodiment of the present invention has been applied. In FIG. 1, the storage system 10 includes business-use hosts 12 and 14, a management server 16, and a storage subsystem 18. The business-use hosts 12 and 14, the management server 16, and storage subsystem 18 are connected to one another via a LAN (Local Area Network) 20 as a communication means, while the business-use hosts 12 and 14 are interconnected via a SAN (Storage Area Network) 22.

The business-use hosts 12 and 14 (business-use computers) each have processors 24 and 26, memories 28 and 30, and host bus adaptors 32, 34, 36 and 38. Each of the host bus adaptors 32 to 38 is connected to the SAN 22.

The storage subsystem 18 includes channel adaptors (CHA) 40, 42, 44 and 46 having ports, and storage devices 48 and 50, whose logical configurations are managed as logical units LU (Logical Units).

The business-use hosts 12 and 14 and the storage subsystem 18 are connected to one another via a plurality of physical paths including the host bus adaptors (HBA) 32 to 38, the SAN 22, and the channel adaptors (CHA) 40 to 46. Also, between the business-use hosts 12 and 14 and the storage subsystem 18, a multi-path (a multiplexed data input/output path) having a plurality of access paths to the logical volumes of the storage devices 48 and 50 is provided, and the storage subsystem 18 and the business-use hosts 12 and 14 send and receive information via each path.

The management server 16 (management computer) includes a processor 52, memory 54 and a database 56, and is configured to perform the management of the business-use hosts 12 and 14 by sending and receiving information to and from the business-use hosts 12 and 14 via the LAN 20.

When the management server 16 manages the business-use hosts 12 and 14, a business-use application 58, a multi-path management agent 60 and a path management table 62 are stored in the memory 28 of the business-use host 12, while the business-use application 58, the multi-path management agent 60, the path management table 62 and a volume management agent 64 are stored in the memory 30 of the business-use host 14.

Meanwhile, an integrated multi-path manager 66 is stored in a memory 54 of the management server 16, and a host management table 68, a schedule management table 70, an integrated path management table 72, an event management table 74 and a storage management table 76 are stored in the database 56.

The business-use application 58 in the business-use hosts 12 and 14 is used as an application for each of the business-use hosts 12 and 14 to perform various business-uses. The multi-path management agent 60 is used as software for managing the multi-path. The path management table 62 is used as a table for managing the route and status of the paths from the relevant business-use host managed by the multi-path management agent 60.

In the path management table 62, for example, as shown in FIG. 2, a numeric values relating to paths (identifiers) are stored in a "PATH ID" (Identification) column 100. The numeric value uniquely specifies a path within a host. Also, identifiers HBA1 and HBA2 relating to host bus adaptors are stored in a "HBA" column 102, the identifiers ST1 of the storage subsystem 18 are stored in a "STORAGE" column 104, the channel adaptor identifiers CHA1 and CHA2 are stored in a "CHA" column 106, the identifiers LU1 relating to the storage devices 48 and 50 are stored in an "LU" column 108, and attributes such as an identifier "Online" or similar are stored in a "PATH STATUS" column 110.

Note that the path management table 62 may not have actual values for each attribute information. For example, it may be possible to register an internal identifier for the program of the channel adaptor as an attribute in the path management table 62, create a channel adaptor list table (a channel adaptor identifier or channel adaptor name) as another path management table, and relate both tables to one another.

The volume management agent 64 is used as an agent for transferring volume information in the business-use hosts 12 and 14 to a volume manager (not shown).

Meanwhile, the integrated multi-path manager 66 in the management server 16 is configured as integrated multi-path management software for managing connection information between each of the business-use hosts 12 and 14 and the storage subsystem 18 in the SAN environment. The host management table 68 is configured as a table for storing host information relating to business-use hosts (hosts), which are management targets.

As names for the business-use hosts (hosts) that are management targets, for example, host 1, host 2, host 3 are stored in a "HOST NAME" column 112 in the host management table 68, address numbers relating to the respective hosts are stored in an "IP (Internet Protocol) ADDRESS" column 114, port numbers relating to the respective hosts are stored in a "PORT" column 116, information relating to an OS (Business-use System) corresponding to each host are stored in an "OS" column 118, agent version numbers (5.0) are stored in an "AGENT" column 120, numeric values relating to the accumulated count of failure pollings are stored in a "CONSECUTIVE ERROR COUNT" column 122, and agent version numbers (4.5) are stored in a "VOLUME MANAGEMENT AGENT" column 124. Note that, if the numeric value stored in the "CONSECUTIVE ERROR COUNT" column 122 exceeds a certain value, the relevant host is deleted from the host management table 68.

Of configuration information registered with the integrated multi-path manager 66, the configuration information for periodically performing a network scan is stored in the schedule management table 70. The network scan is a scanning operation for the management server 16 to sequentially send a communication request via the LAN to each communication target that is a business-use host which can be a communication target.

Specifically, as shown in FIG. 4, the IP addresses that are to be communication targets at the time the communication starts are stored in a "START IP ADDRESS" column 126 in the schedule management table 70, IP addresses at the time the communication terminates are stored in an "END IP ADDRESS" column 128, the port numbers for communication targets are stored in a "PORT" column 130, the communication execution starting times are stored in an "EXECUTION STARTING TIME" column 132, information relating to the frequency of the communication are stored in a "FREQUENCY" column 134, and the times for executing the schedules for next time are stored in a "NEXT EXECUTION TIME" column 136.

The integrated path management table 72 is configured as a table for storing information relating to all the business-use hosts managed by the integrated multi-path manager 66. Specifically, as shown in FIG. 5, information relating to an identifier that uniquely specifies a path within the integrated path management table 72 are stored in a "PATH ID" column 138 in the integrated path management table 72, host names for the business-use hosts (management targets) are stored in a "HOST" column 140, names of the host bus adaptors corresponding to the business-use hosts (management targets) are stored in a "HBA" column 142, information relating to the storage subsystem 18 used by the business-use hosts (management targets) is stored in a "STORAGE" column 144, information relating to the product number of the storage subsystem 18 are stored in a "SERIAL NUMBER" column 146, information relating to the channel adaptors (CHA) in the storage subsystem 18 are stored in a "CHA" column 148, information relating to the storage subsystem 18 storage devices are stored in an "LU" column 150, and statuses such as the identifier "Online," etc., are stored as attributes in a "PATH STATUS" column 152.

Figure 6:
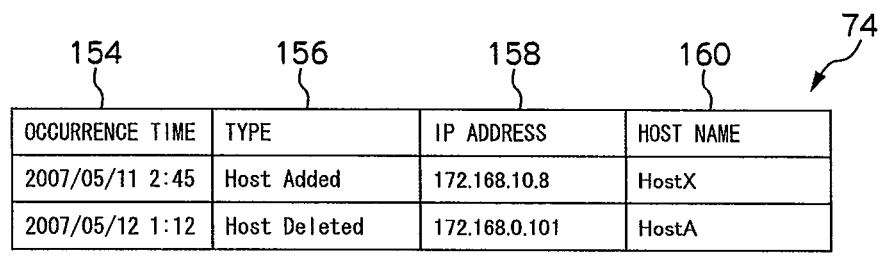
FIG. 6 is a configuration diagram of an event management table.

The event management table 74 is configured as a table for storing a host deletion history generated by network scanning or polling, which is controlled by a schedule. Specifically, as shown in FIG. 6, information relating to the time of occurrence of an event are stored in an "OCCURRENCE TIME" column 154 in the event management table 74, information relating to addition or deletion of hosts are stored in a "TYPE" column 156, information relating to the IP address of hosts being added or deleted are stored in an "IP ADDRESS" column 158, and information relating to the name of a host deleted or added are stored in a "HOST NAME" column 160.

Figure 7:
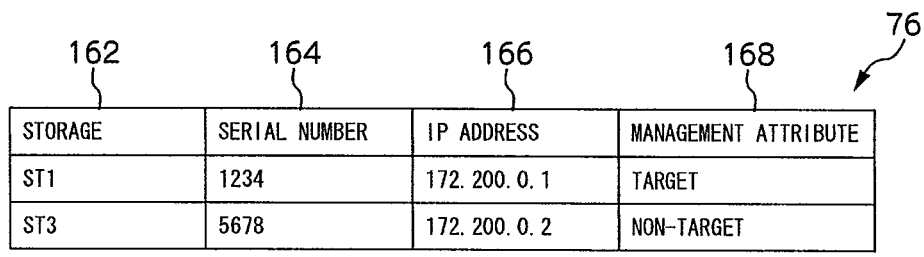
FIG. 7 is a configuration diagram of a storage management table.

The storage management table 76 is configured as a table for storing information relating to the storage subsystem 18. Specifically, as shown in FIG. 7, storage names like those for the storage subsystem 18 are stored in a "STORAGE" column 162 in the storage management table 76, information relating to the serial number of storages (the storage subsystem 18) are stored in a "SERIAL NUMBER" column 164, information relating to IP addresses indicating the destination with which the storage communicates are stored in an "IP ADDRESS" column 166, and information relating to whether or not the relevant storages are management targets are stored in a "MANAGEMENT ATTRIBUTE" column 168.

Note that, if the attribute of a host connected to a storage is stored as "non-target" in the relevant "MANAGEMENT ATTRIBUTE" column 168, it indicates that, even when the business-use host is found during the network scan performed by the management server 16, the business-use host will not be registered as a host being a management target.

Next, network scan processing will be described with reference to the flowchart shown in FIG. 8. Network scan processing is executed by the processor 52 in the management server 16 according to a user's instigation or registered schedules. When a user instigates the processing, as shown in FIG. 11, a network scan execution screen is displayed on a display screen 200 of a display unit (not shown), and a field 202 for entering the start IP address, a field 204 for entering the end IP address, a field 206 for entering the port number, an execution button 208, and a cancel button 210 are shown on the network scan execution screen.

Figure 8:
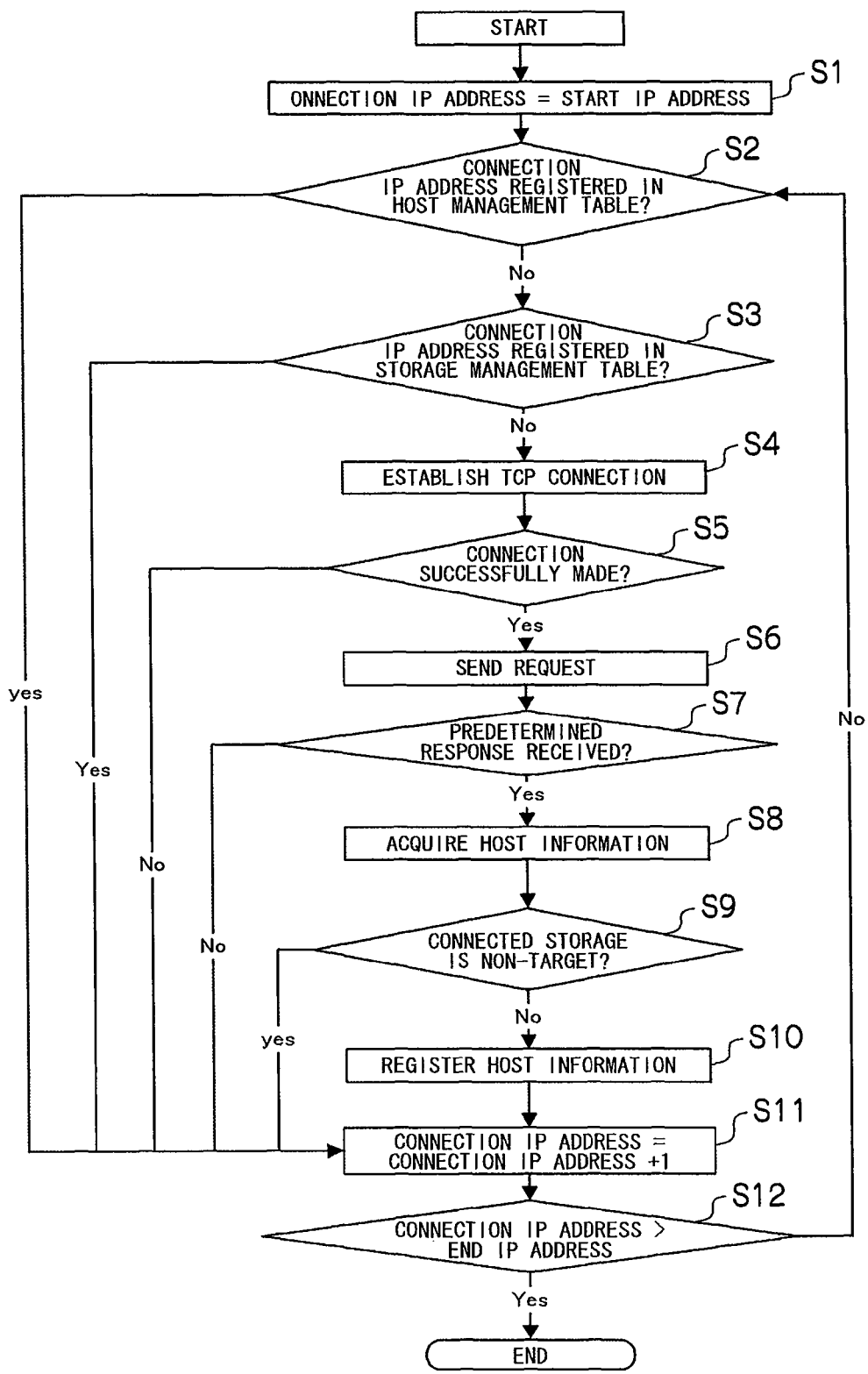
FIG. 8 is a flowchart illustrating network scan processing.

In FIG. 8, when the processor 52 individually sends a predetermined communication request to all IP addresses/ports within a range specified by the user, first, the processor 52 sets "connection IP address=start IP address" (S1), judges whether or not the connection IP address is registered on the host management table 68 (S2)—if the connection IP address is registered, the processor 52 proceeds to step S11; if the connection IP address is not registered, the processor 52 judges whether or not the connection IP address is registered on the storage management table 76 (S3)—if the connection IP address is registered, the processor 52 proceeds to step S11; if the connection IP address is not registered, the processor 52 establishes a TCP (Transmission Control Protocol) connection (S4), judges whether or not the connection has been successfully connected (S5)—if the connection fails, then proceeds to step S11; and if the connection was successful, the processor 52 sends the predetermined communication request (S6).

Next, on the premise that the processor 52 sent the communication request to business-use hosts assumed as management targets in order to determine whether or not any host returning a response in reply to the communication is present, the processor 52 judges whether or not a predetermined response has been received (S7), if a predetermined response has not been received, the processor 52 proceeds to step S11; if a predetermined response is received, the processor 52 acquires host information (S8). More specifically, if the multi-path management agent 60 exists and is running on the business-use hosts 12 and 14 connected to the LAN 20, each of the business-use hosts 12 and 14 recognizes that the multi-path agent 60 is in operation and returns the predetermined response to the management server 16 via the LAN 20.

When the management server 16 has received the predetermined response and acquired the host information, the management server 16 judges whether or not a connected storage (the storage subsystem 18) is a non-target (S9), and if the attached storage is a non-object, the management server 16 proceeds to the step S11. On the other hand, if the attached storage is an object, the management server 16 registers the received host information in the integrated multi-path manager 66 and in the host management table 68 (S10), sets "the connection IP address=the connection address+1" (S1), judges whether or not "the connection IP address>the end IP address", and repeats the processes from S2 to S11 until the connection IP address matches the end IP address.

In network scan processing executed by the processor 52, the processor 52 sends the communication request to the communication target IP addresses that are in the range of from the start IP address to the end IP address. In this step, if the connection IP address is the same as that of a business-use host that is already registered, the processor 52 does not send the communication request. Also, the processor 52 does not send the communication request if the connection IP address exists in the storage management table 76. Furthermore, if the connection IP address is already used by the storage subsystem 18, any connection will fail, and it means that no management target business-use host exists. Therefore the processor 52 stops the process and sends the communication request to the next IP address by recognizing it as the connection IP address. Moreover, if a predetermined response is not received even when the connection is successful, it means that a particular multi-path agent is not running even though the management target business-use host exists. In this case too, the processor 52 stops the process and sends the communication request to the next IP address by recognizing it as the connection IP address.

Also, the host information includes, as information relating to the business-use host, a host name, an OS, information relating to the version of the multi-path management agent and path information existing on the relevant business-use host. This path information includes information for specifying the storage subsystem 18 to which the path connects. Also, as shown in FIG. 12, when network scan processing has been completed, the network scan execution screen showing a network scan result will be displayed on the display screen 200.

Figure 9:
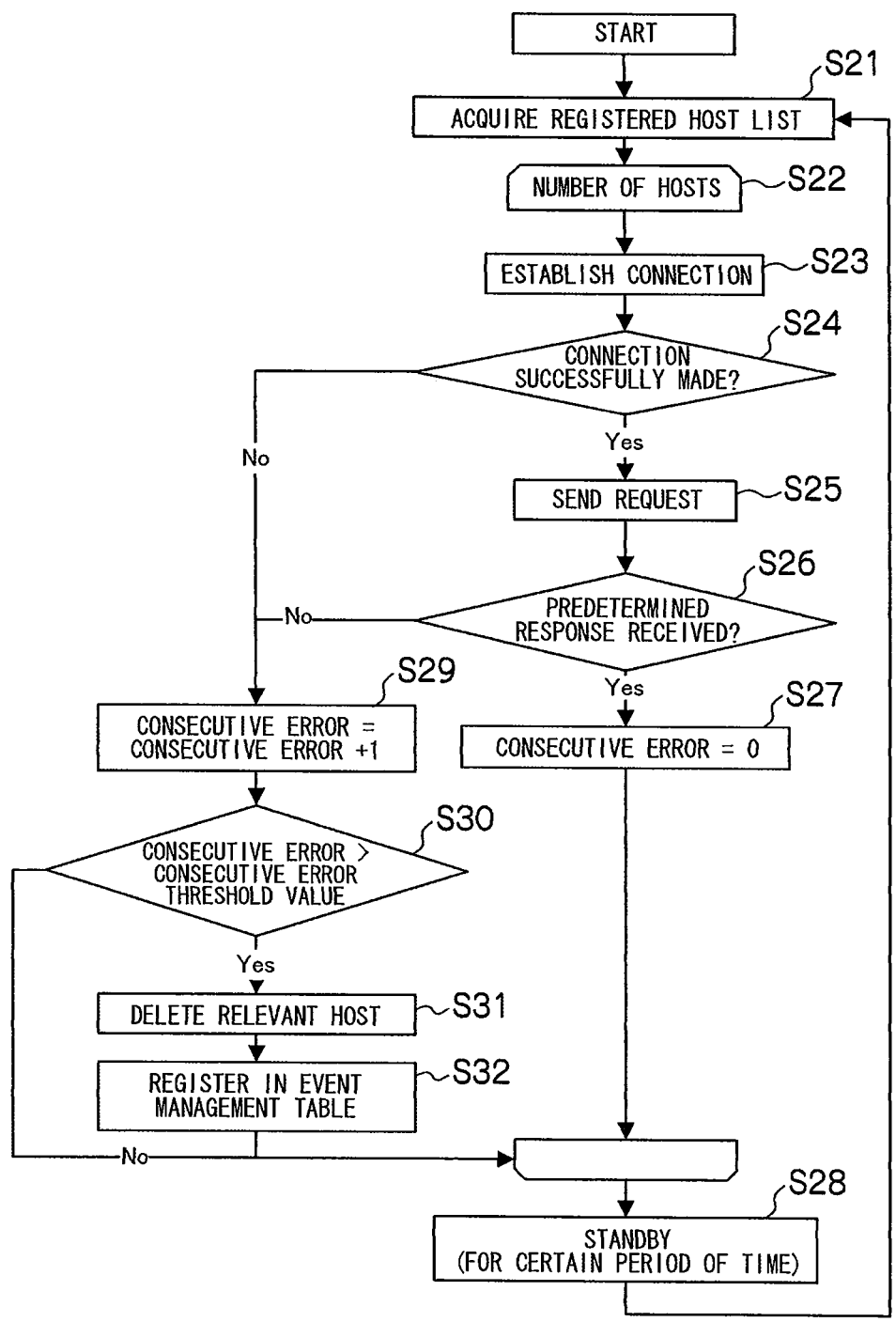
FIG. 9 is a flowchart illustrating polling/host deletion processing.

Next, polling/host deletion processing will be described with reference to the flowchart shown in FIG. 9. According to a predetermined program, the processor 52 in the management server 16 executes the polling/host deletion processing on a management target business-use host that is a management target or a communication target. First, in order to periodically send connection/communication requests to business-use hosts (hosts) registered on the host management table 68 controlled by the integrated multi-path manager 66, the processor 52 acquires the list of registered hosts from the host management table 68 (S21), ascertains the number of hosts (S22), establishes the connection to business-use hosts (hosts) that are communication targets (S23), and then judges whether or not the connection has successfully been made (S24).

If connection to a communication target business-use host (a host) is successfully made, the processor 52 sends a communication request to the communication target business-use host (S25), then judges whether or not a predetermined response is received (S26), and if the predetermined response is received, the processor 52 sets the value of a consecutive error count to zero (S27), then terminates the loop processing for the business-use host. Next, the processor 52 sequentially executes the polling processing on all the business-use hosts, and after completing the polling processing on all business-use hosts, the processor 52 remains on standby for a certain period of time (S28), and then proceeds to step S21, and repeatedly executes the same processing on other communication target hosts.

Meanwhile, if the connection fails in step S24 or the predetermined response is not received in step S26, the processor 52 sets the value of the consecutive error count to +1 (S29), judges whether or not the value of the consecutive error count is larger than the threshold value of the consecutive error count (S30), and if the value of the consecutive error count is smaller than the threshold value, the processor 52 proceeds to step S21 after a lapse of a certain period of time. If the value of the consecutive error count exceeds the threshold value, the processor 52 deletes the relevant business-use host (S31), registers the deleted business-use host in the event management table 74 (S32), then terminates the loop processing for the business-use host. Next, the processor 52 sequentially executes the polling processing for all the business-use hosts, and after completing the polling processing on all the business-use hosts, the processor 52 remains on standby for a certain period of time, and then proceeds to step S21

When the processor 52 executes the polling/host deletion processing, if the processor 52 repeatedly failed in the connection/communication request procedures more than a certain number of times, the processor 52 recognizes that the relevant business-use host has already been removed, and deletes (eliminates) the registered information for the relevant business-use host from the event management table 74. On the other hand, if the processor succeeded in the connection/communication request procedures, the processor 52 resets the value of the consecutive error count to zero, thereby eliminating the impact of cases like when the business-use hosts are temporary halted.

Next, schedule execution processing will be described. The processor 52 in the management server 16 executes the processing according to a predetermined program. In this processing, when a network scan is executed based on a schedule registered by a user, as shown in FIG. 11, a network scan execution screen is displayed on the display screen 200, and the network scan processing is executed by the user operating a button 208. As shown in FIG. 12, the result is displayed on the display screen 200. Also, when the user registers a schedule, a field 202 for entering the start IP address, a field 204 for entering the end IP address, a field 206 for entering the port number, a field 212 for entering the starting time, a field 214 for entering the frequency, a register button 216 and a cancel button 218 are displayed on the display screen 200.

Figure 15:
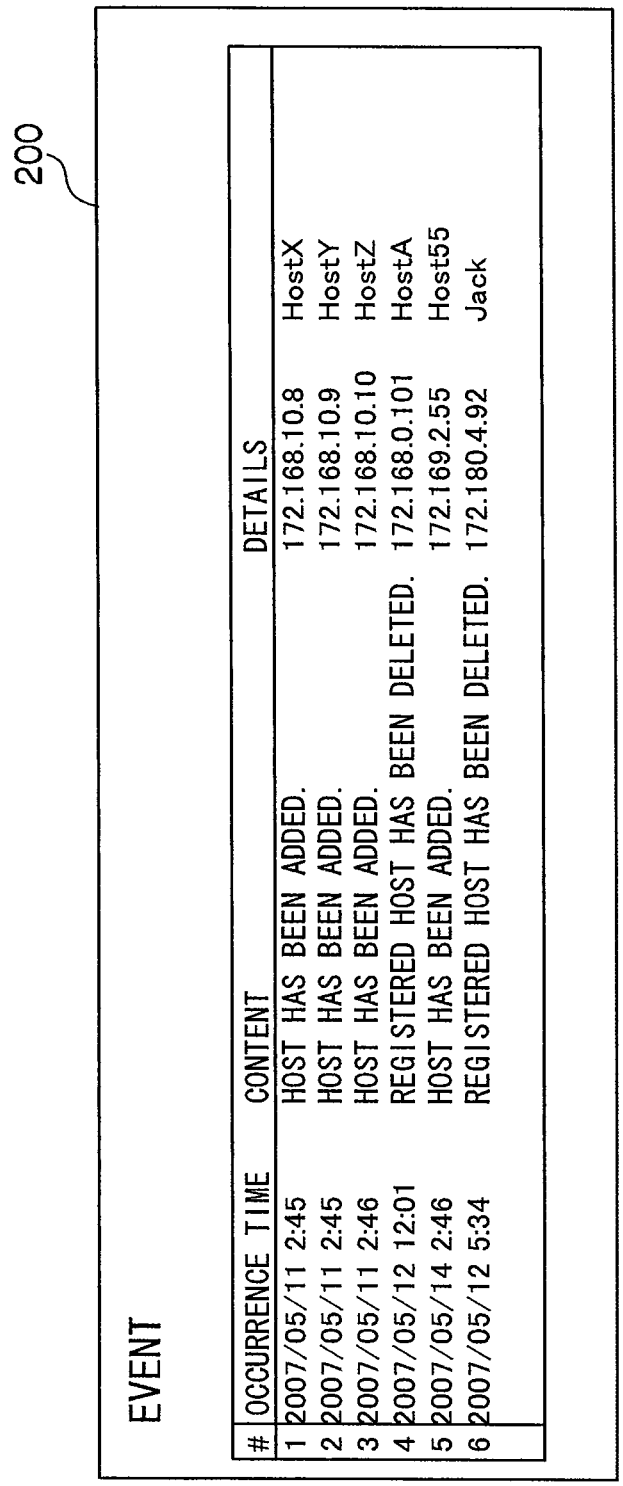
FIG. 15 is a diagram showing an example display of a event list screen.

Regarding the frequency, as shown in FIG. 13, an execution interval may be decided as, for example, every day, every week, every month, etc. If the execution interval is every day, it is possible to choose the option of non-execution on Saturdays and Sundays. If the execution interval is every week, it is possible to designate a day of the week; if the execution interval is every month, it is possible to designate a day of the month, or even possible to designate the last day of the month. As shown in FIG. 14, the schedule list screen showing registered content is displayed on the display screen 200. Also, as shown in FIG. 15, event content, for example, information relating to the addition or removal of hosts is displayed as an event list screen on the display screen 200.

Figure 10:
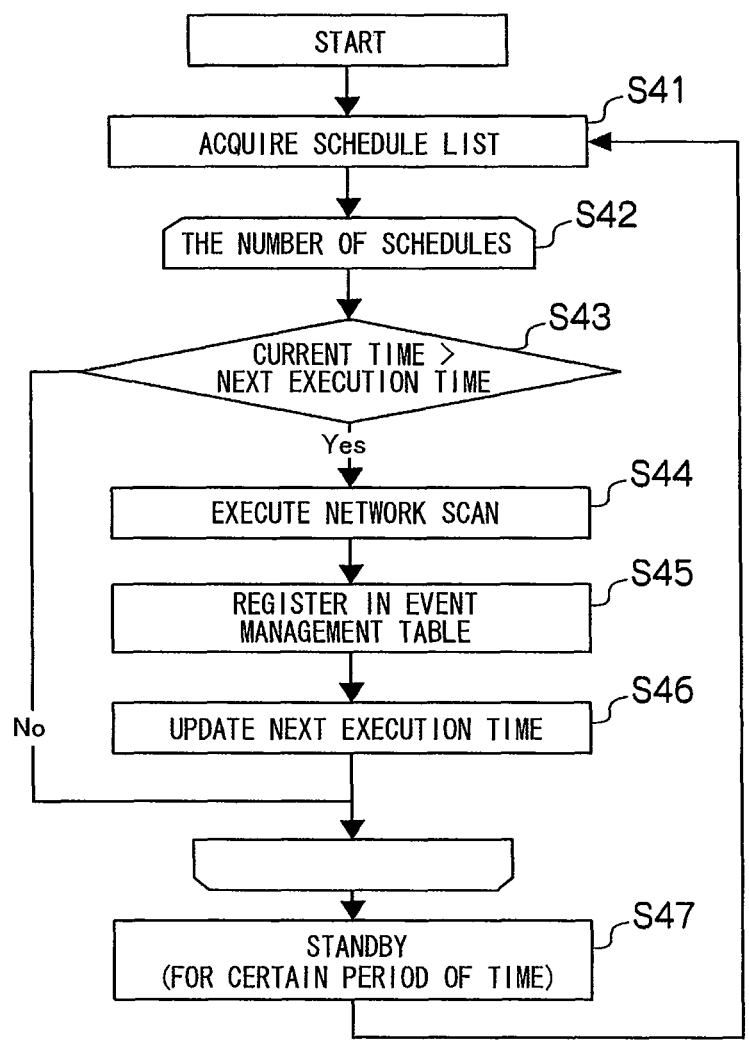
FIG. 10 is a flowchart illustrating schedule execution processing.

Next, the specific details of schedule execution processing will be described with reference to the flowchart shown in FIG. 10. When executing the network scan based on a schedule, the processor 52 acquires a schedule list by referring to the schedule management table 70 (S41), ascertains the number of schedules (S42), compares the current time to the next execution time, judges whether or not the current time is earlier than the next execution time (S43), if the current time is earlier than the next execution time, the processor 52 executes the network scan processing using the start IP address, the end IP address and the port number set for the relevant schedule (S44).

After that, the processor 52 registers the result of the network scan processing in the event management table 74 (S45), calculates the next execution time from the frequency and execution time set for the relevant schedule, and updates the next execution time for the relevant schedule (S46), and when the business-uses for all the schedules are complete, the processor 52 remains on standby for a certain period of time (S47), and then returns to step S41 and repeats the same steps. Incidentally, in step S43, if the current time is not earlier than the next execution time, the processor 52 remains on standby for a certain period of time, and then returns to step S41 and repeats the same steps.

The processor 52 executes the network scan processing based on the schedule so that the management server 16 recognizes the management target business-use hosts on a regular basis.

According to the first embodiment, a communication request is sent from the management server 16 to all the IP addresses/ports within a range specified by the user, and the business-use hosts returning a response in reply to the communication request are registered as the management target business-use hosts so that the management target business-use hosts can be reliably recognized and registered, even when business-use host addition or removal is conducted.

Also, according to the first embodiment, the communication request is periodically sent to the business-use hosts registered as management target hosts, and when a response in reply to the communication request is not returned from a management target host in accordance with certain conditions, the business-use host not returning the response is deleted from the host management table 68 so that the latest information relating to the management target business-use hosts can be automatically maintained.

Figure 16:
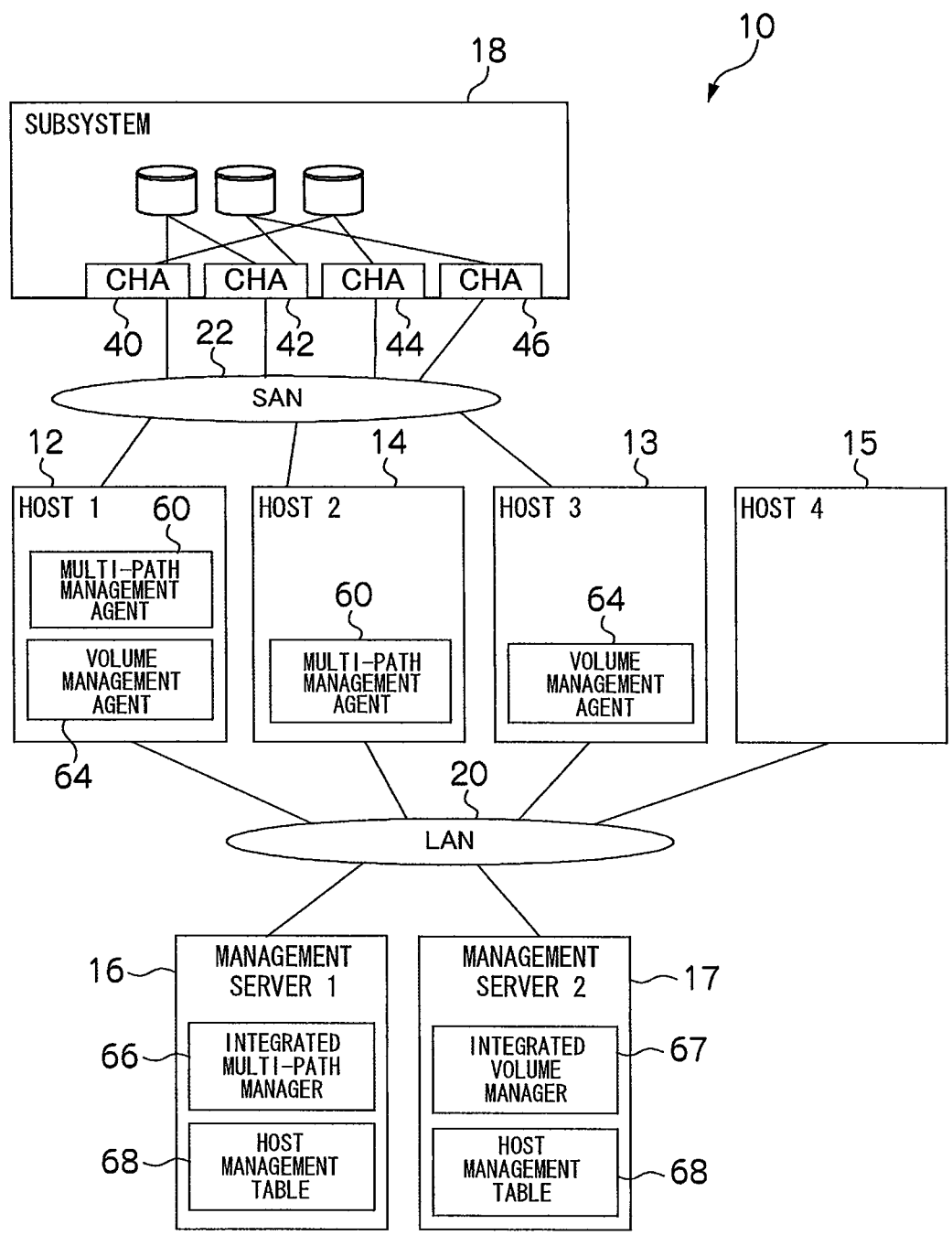
FIG. 16 is a block diagram showing the configuration of a storage system according to another embodiment of the present invention.

Next, a second embodiment of the present invention will be described with reference to FIG. 16. Note that the second embodiment is directed to a storage system 10 including volume management agents. Furthermore, the second embodiment includes, other than the business-use hosts 12 and 14, business-use hosts 13 and 15 connected to the SAN 22 and the LAN 20; and other than the management server 16, a management server 17 connected to the LAN 20. Other components or arrangements are the same as those in the aforementioned embodiment, and so their descriptions have been omitted.

A business-use application 58 and a volume management agent 64 are stored in the memory in a business-use host 13, and the same components as those in the business-use hosts 12 and 14 are stored in the memory in a business-use host 15. Besides a host management table 68, an integrated volume manager 67 for sending and receiving information to and from the integrated multi-path manager 66 in the management server 16 is stored in the management server 17.

In the storage system 10 according to the second embodiment, in addition to the volume management agent other than multi-path management agent 60, there may exist in a business-use host, and it is assumed that a user can operate both the multi-path management agent 60 and volume management agent on the same business-use host, and the case where the user may use either or neither of those agents is also taken into consideration.

More specifically, the integrated volume manager 67 in the management server 17 has host information collected from the respective volume management agents in the business-use hosts 12 to 15. Here, the integrated multi-path manager 66 in the management server 16 communicates with the integrated volume manager 67 in the management server 17 at certain time intervals, collects host information, and compares the collected host information with registered host information, so that the business-use host, whose volume management agent is running although its multi-path management agent is not running, is recognized and registered on the host management table 68.

Figure 17:
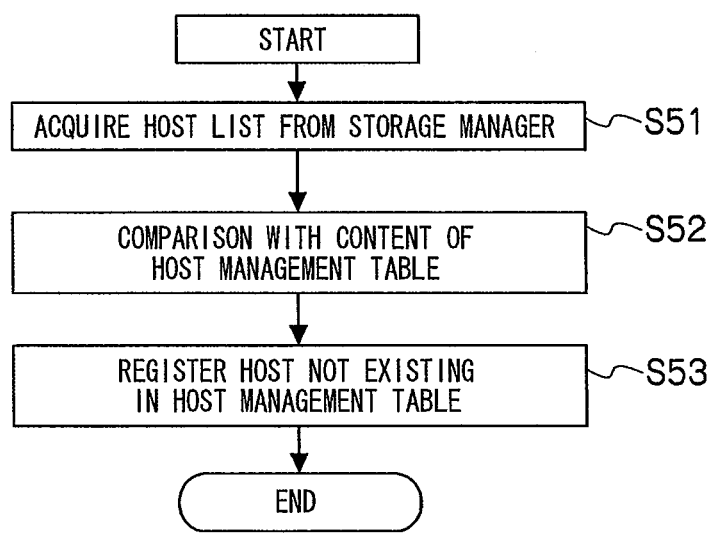
FIG. 17 is a flowchart illustrating host information comparison processing.

Next, host information comparison processing will be described with reference to the flowchart shown in FIG. 17. This processing is executed by the processor 52 in the management server 16. First, the processor 52 in the management server 16 activates the integrated multi-path manager 66, acquires host information relating to a list of hosts including business-use hosts whose volume management agents are running although their multi-path management agents are not running (S51), compares the acquired host information with host information registered on the host management table 68 (S52), registers business-use hosts not existing in the host management table, i.e., business-use hosts, whose volume management agents are running although their multi-path management agents are not running, in the host management table 68 (S53), and then terminates the processing in this routine.

Figure 18:
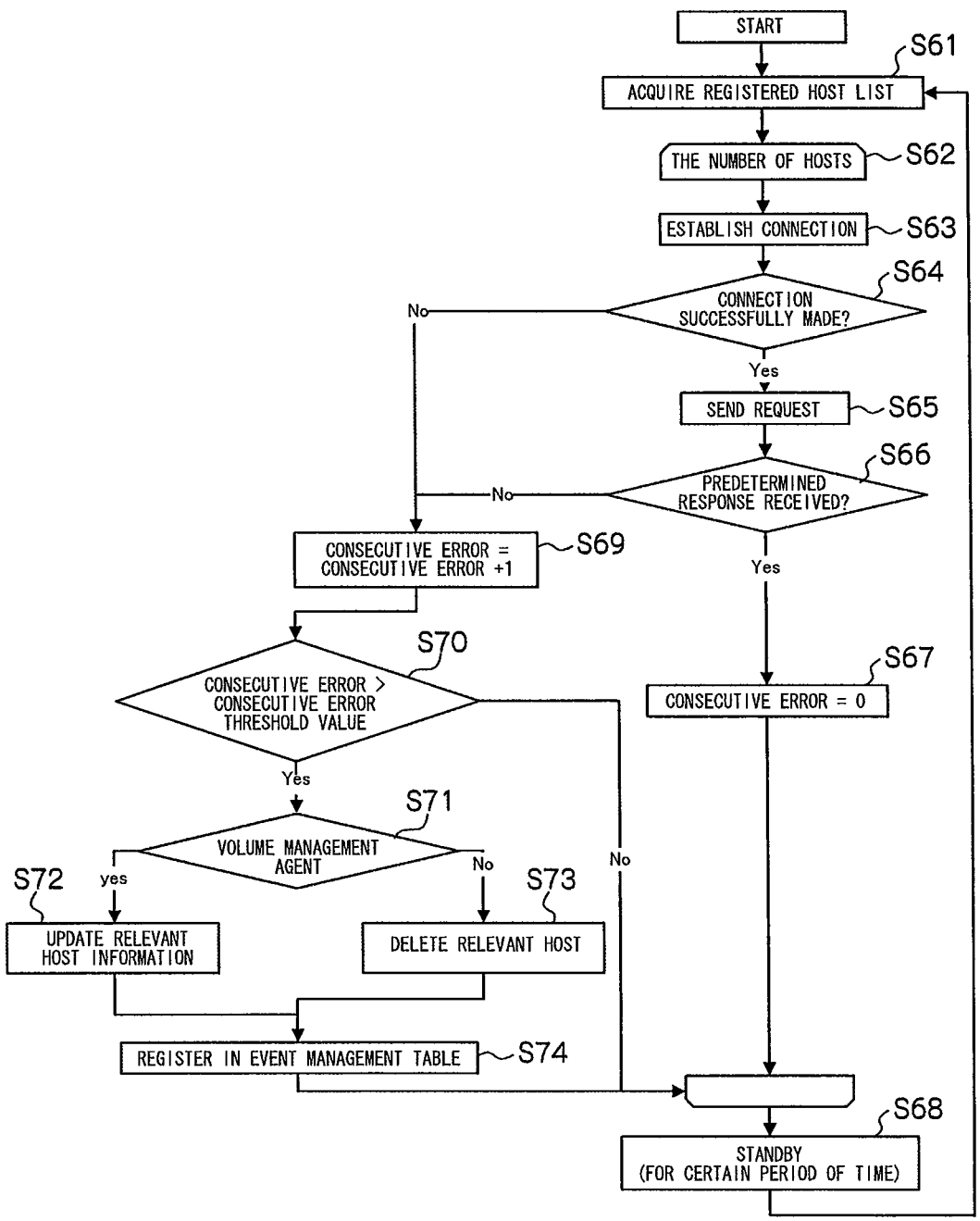
FIG. 18 is a flowchart illustrating polling/host deletion processing.

Next, polling/host deletion processing in the second embodiment will be described with reference to the flowchart shown in FIG. 18. This processing is executed by the processor 52 in the management server 16 based on a predetermined program. Incidentally, when the processor 52 executes the polling/host deletion processing, the descriptions for steps S61 to S70 will be omitted because they are the same as those for steps S21 to S29 in FIG. 8 in the first embodiment.

In step S70, when the processor 52 has judged that the consecutive error count exceeds the predetermined value, it judges whether or not the volume management agent 64 exists (S71), and if the volume management agent 64 exists, it updates information relating to the relevant business-use host (S72). If the volume management agent does not exist, it deletes the relevant business-use host (S73), registers the content of each processing in the event management table 74

(S74), remains on standby for a certain period of time (S68), and then proceeds to step S61, and executes processing the same as that of step S61.

When there is a business-use host not returning a response to the communication request in the polling processing executed by the management server 16 more than a certain number of times in a row, normally the relevant business-use host will be deleted. However, in the second embodiment, without deleting information relating to the business-use host managed by the integrated volume manager 67, the content of the host management table 68 in the management server 16 is updated, the business-use host not returning a response to the communication requests in the polling processing executed by the management server 16 more than a certain number of times in a row is handled as a business-use host not running the multi-path management agent 60 and is regarded as a business-use host managed by the integrated multi-path manager 62. By performing the processing like this, business-use hosts can be treated same as those for which the multi-path agents have been uninstalled.

According to the second embodiment, when there is a business-use host not returning a response in reply to the communication request from the management server 16, the integrated multi-path manager 66 in the management sever 16 is activated, host information that relates to the business-use host, whose volume management agent is running although its multi-path management agent is not running, is acquired from the integrated volume manager 67 in the management server 17, the acquired information is compared to host information registered on the host management table 68, whereby the business-use host, whose volume management agent is running although its multi-path management agent is not running, can be registered on the host management table 68.

What is claimed is:

1. A storage system comprising:
   a plurality of business-use computers, each business-use computer capable of storing one of a multi-path management agent and a volume management agent;
   a storage subsystem to which the plurality of business-use computers are connected; and
   a management computer managing the plurality of business-use computers,
   wherein the plurality of business-use computers, the storage subsystem and the management computer are connected to one another via a communication unit,
   wherein the management computer includes a multi-path manager and a volume manager and a table for registering the business-use computers that are connected to the storage subsystem and storing information indicating whether or not each of the business-use computers has a volume management agent and information indicating whether or not each of the business-use computers has a multi-path management agent,
   wherein the management computer sequentially sends a communication request via the communication unit to a communication target that can be a management target, registers in the table a reception result associated with the transmission of the communication request in the table, determines whether or not a business-use computer that does not return a response in reply to the communication request has the volume management agent or multi-path management agent, deletes the information concerning the volume management agent of the business-use computer from the table if the business-use computer does not have the volume management agent, and deletes the information concerning the multi-path management agent of the business-use computer from the table if the business-use computer does not have the multi-path management agent,
   wherein the multi-path management agent is in communication with the multi-path manager of the management computer, and the multi-path management agent is agent software for replying to the multi-path manager of the management computer with management information concerning a multi-path between the business-use computer and the storage subsystem, and
   wherein the volume management agent is in communication with the volume manager of the management computer, and the volume management agent is agent software for replying to the volume manager of the management computer with management information concerning volume information of the business-use computer.

2. The storage system according to claim 1, wherein the management computer recognizes all of one or more IP addresses and ports within a specified range as communication targets.

3. A management method in a storage system comprising:
   a plurality of business-use computers, each business-use computer capable of storing one of a multi-path management agent and a volume management agent;
   a storage subsystem to which the plurality of business-use computers are connected; and
   a management computer managing the plurality of business-use computers,
   wherein the plurality of business-use computers, the storage subsystem and the management computer are connected to one another via a communication unit,
   wherein the management computer includes a multi-path manager and a volume manager and a table for registering the business-use computers that are connected to the storage subsystem and storing information indicating whether or not each of the business-use computers has a volume management agent and information indicating whether or not each of the business-use computers has a multi-path management agent, and manages a management target via the communication unit, and
   wherein the management computer executes:
   a first step of sequentially sending a communication request via the communication unit to a communication target that can be the management target,
   a second step of registering in a table a reception result associated with a transmission of the communication request in the table,
   a third step of determining whether or not a business-use computer that does not return a response in reply to the communication request has the volume management agent or the multi-path management agent, and
   a fourth step of deleting the information concerning the volume management agent of the business-use computer from the table if the business-use computer does not have the volume management agent, and deleting the information concerning the multi-path management agent of the business-use computer from the table if the business-use computer does not have the multi-path management agent,
   wherein the multi-path management agent is in communication with the multi-path manager of the management computer, and the multi-path management agent is agent software for replying to the multi-path manager of the management computer with management information concerning a multi-path between the business-use computer, and the storage subsystem, and wherein the volume management agent is in communication with the volume manager of the management computer, and the volume management agent is agent software for replying to the volume manager of the management computer with management information concerning volume information of the business-use computer.

4. The management method according to claim 3, wherein, in the first step,
wherein the management computer recognizes all the IP addresses and ports within a specified range as communication targets.

5. A management server including a multi-path manager and a volume manager and a table for registering a plurality of business-use computers that are connected via a communication unit to a storage subsystem, and a processor receiving information from the business-use computers via the communication unit and processing the information,
wherein each business-use computer is capable of storing one of a multi-path management agent and a volume management agent;
wherein the table stores information indicating whether or not each of the business-use computers has a volume management agent and information indicating whether or not each of the business-use computers has a multi-path management agent,
wherein the processor sequentially sends a communication request via the communication unit to a communication target that can be a management target, registers a reception result that is associated with the transmission of the communication request in the table, determines whether or not a business-use computer that does not return a response in reply to the communication request has the volume management agent or the multi-path management agent, deletes the information concerning the volume management agent of the business-use computer from the table if the business-use computer does not have the volume management agent, and deletes the information concerning the multi-path management agent of the business-use computer from the table if the business-use computer does not have the multi-path management agent,
wherein the multi-path management agent is in communication with the multi-path manager of the management server, and the multi-path management agent is agent software for replying to the multi-path manager of the management computer with management information concerning a multi-path between the business-use computer and the storage subsystem, and
wherein the volume agent is in communication with the volume manager of the management computer, and the volume management agent is agent software for replying to the volume manager of the management computer with management information concerning volume information of the business-use computer.

6. A storage system comprising:
a plurality of business-use computers, each business-use computer capable of storing a multi-path management agent;
a storage subsystem to which the plurality of business-use computers are connected; and
a management computer managing the plurality of business-use computers,
wherein the plurality of business-use computers, the storage subsystem and the management computer are connected to one another via a communication unit,
wherein the management computer includes a multi-path manager and a table for registering the business-use computers that are connected to the storage subsystem and storing information indicating whether or not each of the business-use computers has a multi-path management agent,
wherein the management computer sequentially sends a communication request via the communication unit to a communication target that can be a management target, registers in the table a reception result associated with the transmission of the communication request in the table, determines whether or not a business-use computer that does not return a response in reply to the communication request has the multi-path management agent, deletes the information concerning the multi-path management agent of the business-use computer from the table if the business-use computer does not have the multi-path management agent, and
wherein the multi-path management agent is in communication with the multi-path manager of the management computer, and the multi-path management agent is agent software for replying to the multi-path manager of the management computer with management information concerning a multi-path between the business-use computer and the storage subsystem.

7. A storage system comprising:
a plurality of business-use computers, each business-use computer capable of storing a volume management agent;
a storage subsystem to which the plurality of business-use computers are connected; and
a management computer managing the plurality of business-use computers,
wherein the plurality of business-use computers, the storage subsystem and the management computer are connected to one another via a communication unit,
wherein the management computer includes a volume manager and a table for registering the business-use computers that are connected to the storage subsystem and storing information indicating whether or not each of the business-use computers has a volume management agent,
wherein the management computer sequentially sends a communication request via the communication unit to a communication target that can be a management target, registers in the table a reception result associated with the transmission of the communication request in the table, determines whether or not a business-use computer that does not return a response in reply to the communication request has the volume management agent, deletes the information concerning the volume management agent of the business-use computer from the table if the business-use computer does not have the volume management agent, and
wherein the volume management agent is in communication with the volume manager of the management computer, and the volume management agent is agent software for replying to the volume manager of the management computer with management information concerning volume information of the business-use computer.

\* \* \* \* \*